US008163365B2

(12) United States Patent
Weiner et al.

(10) Patent No.: US 8,163,365 B2
(45) Date of Patent: Apr. 24, 2012

(54) REPOSITIONABLE LABELS USING DOT PATTERNED ADHESIVE

(75) Inventors: Gary H. Weiner, Madison, WI (US); Michael L. Chambers, Sun Prairie, WI (US)

(73) Assignee: Nastar Inc., Middleton, WI (US)

( * ) Notice: Subject to any disclaimer, the term of this patent is extended or adjusted under 35 U.S.C. 154(b) by 1146 days.

(21) Appl. No.: 11/089,435

(22) Filed: Mar. 24, 2005

(65) Prior Publication Data

US 2006/0216451 A1 Sep. 28, 2006

(51) Int. Cl.
*B32B 3/00* (2006.01)
*B32B 9/00* (2006.01)
*B32B 33/00* (2006.01)

(52) U.S. Cl. ..................... 428/40.1; 428/41.8; 428/42.1; 428/201; 428/202; 428/211.1; 428/220

(58) Field of Classification Search ................. 428/40.1, 428/40.2, 41.7, 41.8, 42.1, 201, 202, 211.1, 428/220, 40.7
See application file for complete search history.

(56) References Cited

U.S. PATENT DOCUMENTS 2,262,798 A * 11/1941 Elliott ........................... 156/518
2,684,316 A 7/1954 Warshaw
2,721,810 A 10/1955 Schram
2,867,317 A 1/1959 Vogt
2,940,868 A 6/1960 Patchell
3,741,786 A 6/1973 Torrey
5,194,299 A 3/1993 Fry
5,431,452 A * 7/1995 Chang et al. .................... 283/95
5,449,540 A 9/1995 Calhoun et al.
5,547,738 A * 8/1996 Mitchell et al. ............ 428/195.1
5,641,506 A 6/1997 Talke et al.
5,650,215 A 7/1997 Mazurek et al.
6,344,260 B1 2/2002 Lythgoe et al.
6,495,229 B1 12/2002 Carte et al.
6,787,208 B2 * 9/2004 Galovic ....................... 428/40.1
2003/0047277 A1 * 3/2003 Bell et al. ...................... 156/290

* cited by examiner

*Primary Examiner* — Patricia Nordmeyer
(74) *Attorney, Agent, or Firm* — Foley & Lardner LLP

(57) ABSTRACT

A method for forming a sheet of label material is provided. The label material is used to form a label for placement on an object and for subsequent removal from the object without damaging the object. The method includes providing a paper substrate that has an adhesive receiving face and coating an adhesive on the adhesive receiving face of the paper substrate using a gravure coater to form a repetitive pattern of adhesive areas. For example, repetitive dots of adhesive assure a uniform, discontinuous coating of adhesive that allows repositioning of the label, that prevents tearing of or damage to a substrate when the label is removed, including from a newspaper, and that maintains sufficient adhesion to adhere to difficult substrates such as textured surfaces. The adhesive is a water based adhesive. In alternative embodiments, the adhesive is coated on an adhesive receiving face of a release liner, and the adhesive receiving face of the paper substrate removably adheres to the release liner. The label material may include ink printed on a print receiving face of the paper substrate. The sheet of material may be die cut to form an irregularly shaped label.

23 Claims, 4 Drawing Sheets

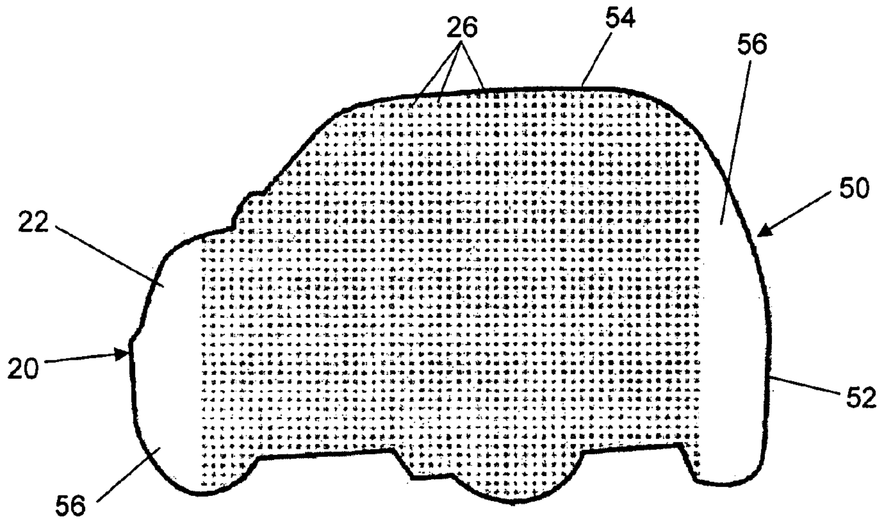
FIG. 5
FIG. 6
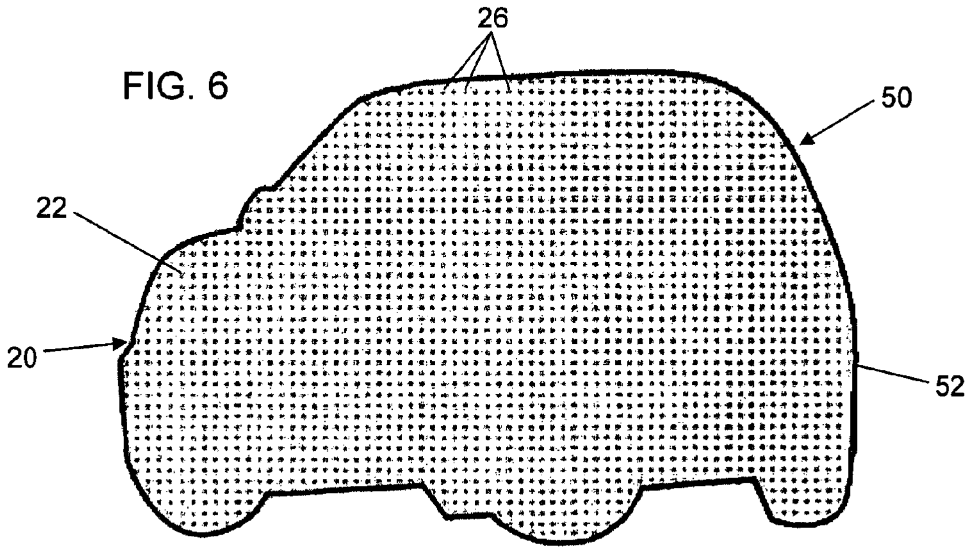

REPOSITIONABLE LABELS USING DOT PATTERNED ADHESIVE

FIELD OF THE INVENTION

The present invention pertains generally to the field of labeling and, more particularly, to labels that can be repositioned using an adhesive applied in a repetitive dot pattern.

BACKGROUND OF THE INVENTION

Repositionable pressure-sensitive adhesives allow an object to adhere to a surface while allowing reapplication of the object to a variety of different surfaces over an extended period of time without damaging or otherwise marring the surface. For example, masking tapes, removable labels or office notes, protective films and medical tapes all must adhere to metal, paper, plastics, and skin, respectively, but must also peel smoothly away from these varied target surfaces without leaving any adhesive residue behind or harming the surface. Certain surfaces pose a particular challenge when a pressure-sensitive adhesive object is adhered to them. For example, the adhesive adhering a label to a newspaper typically damages the newsprint when the label is removed from the newspaper. A need thus exists for a pressure-sensitive adhesive article that can be repositioned after being initially adhered to a variety of target substrates, but that does not damage the surface of the substrate.

SUMMARY OF THE INVENTION

An exemplary embodiment of the invention relates to a sheet for forming a label. The label can be placed on an object and subsequently removed from the object without damaging the object. For example, the label can be placed on newsprint and subsequently removed while maintaining legible newsprint and without tearing of the newspaper. The label, however, maintains sufficient adhesion over time to adhere to difficult substrates, such as textured surfaces, even after removal. Additionally, irregularly shaped labels can be die cut from the sheet and applied to newspapers using high speed applicators without damaging either the label or the newspaper.

The sheet includes, but is not limited to, a paper substrate having an adhesive receiving face and an adhesive. The adhesive is coated on the adhesive receiving face of the paper substrate using a gravure coater to form a repetitive pattern of adhesive areas. In alternative embodiments, the adhesive is coated on an adhesive receiving face of a release liner and the adhesive receiving face of the paper substrate removably adheres to the release liner. The sheet may include ink printed on a print receiving face of the paper substrate and coatings to laminate the paper substrate and/or the release liner. In another alternative embodiment, a printable release coating is coated on the print receiving face of the paper substrate and no release liner is used.

A method for forming the sheet of label material includes providing a paper substrate having an adhesive receiving face and coating an adhesive on the adhesive receiving face of the paper substrate using a gravure coater to form a repetitive pattern of adhesive areas. The adhesive areas may form a variety of shapes including various polygons, circles, and ellipses. In an exemplary embodiment, the adhesive areas are circles having a diameter in the range from about 0.9 millimeters (mm) to about 1.25 mm. The spacing between adhesive areas 26 in adjacent rows and columns is about 0.5 mm. The height of the adhesive areas is about 0.375 mm.

Other principal features and advantages of the invention will become apparent to those skilled in the art upon review of the following drawings, the detailed description, and the appended claims.

BRIEF DESCRIPTION OF THE DRAWINGS

The exemplary embodiments will hereafter be described with reference to the accompanying drawings, wherein like numerals will denote like elements.

FIG. 5 is a top view of a label in accordance with a first exemplary embodiment of the present invention.

FIG. 6 is a top view of a label in accordance with a second exemplary embodiment of the present invention.

DETAILED DESCRIPTION OF THE EXEMPLARY EMBODIMENTS

Figure 1:
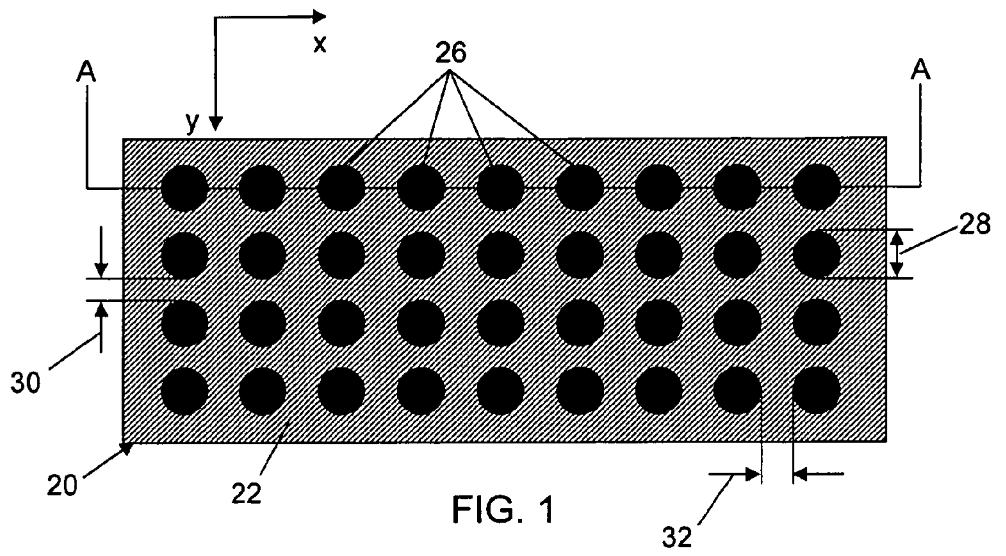
FIG. 1 is a top view of a substrate having an application of adhesive in accordance with an exemplary embodiment of the present invention.
Figure 2:
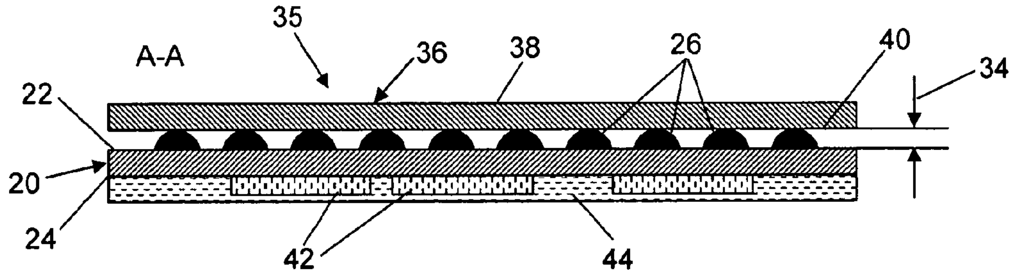
FIG. 2 is a cross sectional view of an article in accordance with a first exemplary embodiment of the present invention.

With reference to the exemplary embodiment of FIG. 1, a top view of a paper stock 20 is shown. The paper stock 20 includes a back surface 22 and a printing surface 24 (shown in FIG. 2) facing opposite the back surface 22. Adhesive areas 26 form a repetitive pattern of adhesive in the form of geometric shapes on the back surface 22 of the paper stock 20. The adhesive areas 26 may form a variety of shapes including various polygons, circles, and ellipses. The cross section of the adhesive areas 26, as shown in FIG. 2, may similarly have different shapes including various polygons and semicircles. The pattern may have a regular spacing in the horizontal direction x and vertical direction y. Using a gravure coating process, the range for the diameter 28 of the adhesive areas 26 to achieve adequate adhesive performance is 0.5 millimeters (mm) to 1.25 mm. Larger adhesive areas 26 tend to lose their form and smaller adhesive areas 26 are ineffective. Preferably, the diameter 28 of the adhesive areas 26 is in the range from about 0.9 mm to about 1.25 mm.

More critical to achieving adequate adhesion is the spacing between the adhesive areas 26 required to assure a uniform discontinuous coating. The vertical spacing 30 between adhesive areas 26 in adjacent rows is about 0.5 mm. The horizontal spacing 32 between adhesive areas 26 in adjacent columns is also about 0.5 mm. The height 34 of the adhesive areas 26 is about 0.375 mm. The effective coat weight range is from about 0.3 g/csi (grams per 100 square inches) to about 0.6 g/csi. Preferably, the effective coat weight range is 0.4 g/csi+/−0.075. Some newspapers, however, use 27# paper instead of the standard 30# paper and, as a result, have better performance using the lower portion of the effective coat weight range.

With reference to the exemplary embodiment of FIG. 2, an article 35 is shown in cross section. The article 35 includes the paper stock 20, the adhesive areas 26, a release liner 36, ink layers 42, and a coating 44. The release liner 36 includes a first surface 38 and a second surface 40 facing opposite the first surface 38. The second surface 40 releasably adheres to the adhesive areas 26. The first surface 38 and/or the second surface 40 of the release liner 36 is coated with a release coating. The release coating may be any of those known to those skilled in the art now or in the future. For example, silicone release coating may be used. The release coating prevents the adhesion of the adhesive areas 26 to the second surface 40 of the release liner 36.

Figure 3:
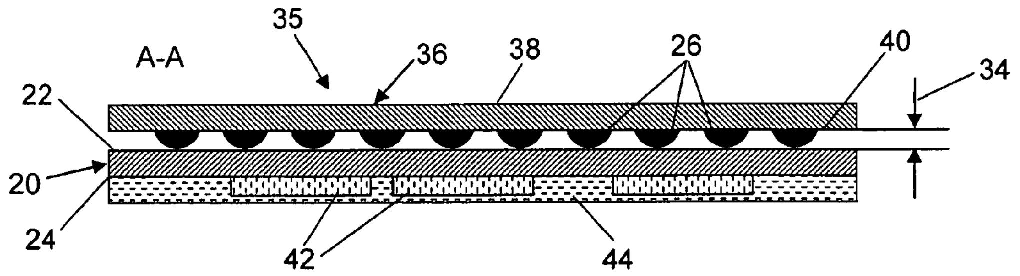
FIG. 3 is a cross sectional view of an article in accordance with a second exemplary embodiment of the present invention.

The ink layers 42 are printed onto the printing surface 24 of the paper stock 20 as known to those skilled in the art. Any printing technique can be used. In an exemplary embodiment, water based flexography is used. The coating 44 may be laminated over the ink layers 42 to provide protection of the second surface 24 of the paper stock 20. Coatings 44 may be an emulsion acrylic polymer, a rubber based emulsion, or a water based microsphere adhesive dispersion. Preferably, the coating 44 is a water based microsphere adhesive dispersion. No ink layers 42 or coating 44 is required to form the article 35. In alternative embodiments, the adhesive areas 26 may be formed on the second surface 40 of the release liner 36 as shown with reference to FIG. 3.

Figure 4:
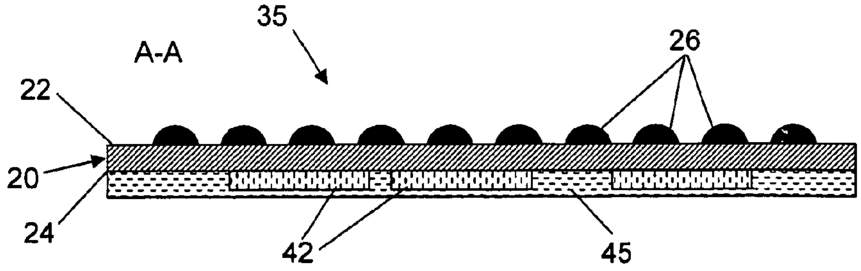
FIG. 4 is a cross sectional view of an article in accordance with a third exemplary embodiment of the present invention.

The article 35 may also be produced without a release liner 36 as shown with reference to FIG. 4. The purpose of the release liner is to protect the adhesive and to allow it to dispense from a roll. This may also be achieved by putting a printable release coating 45 on the printing surface 24 of the paper stock 20. For example, the printable release coating 45 may be a water based printable release agent coated onto the paper stock 20 possibly using a gravure coater.

With reference to FIG. 5, a first label 50 is shown in an exemplary embodiment. The first label 50 has an irregular peripheral edge 52. The irregular peripheral edge 52 may define a known shape such as the vehicle outline indicated for the first label 50. The first label 50 is formed of the paper stock 20 and includes the adhesive areas 26 that form a repetitive dot pattern on the back surface 22 as shown with reference to FIGS. 1 and 2. The first label 50 may include a leading edge 54 and one or more non-adhesive area 56. The leading edge 54 may extend along any length of the peripheral edge 52. The non-adhesive area 56 simplifies the removal of the first label 50 from a surface by providing one or more edge along which the first label 50 may be grasped for lifting from the surface to which the first label 50 is adhered. As shown with reference to FIG. 6, the non-adhesive area 56 is not required. The first label 50 is, for example, adhered to a surface such as a newspaper. Use of the repetitive dot pattern shown with reference to FIGS. 5 and/or 6 allows removal of the first label 50 while maintaining legibility of the newsprint to which the first label 50 is adhered. The first label 50, however, maintains sufficient adhesion over time to adhere to difficult substrates, such as textured surfaces, even after removal and reapplication.

Figure 7:
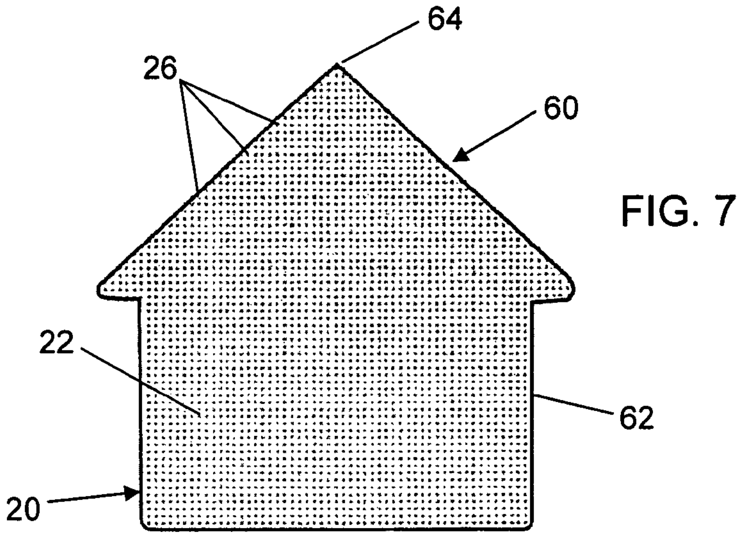
FIG. 7 is a top view of a label in accordance with a third exemplary embodiment of the present invention.
Figure 8:
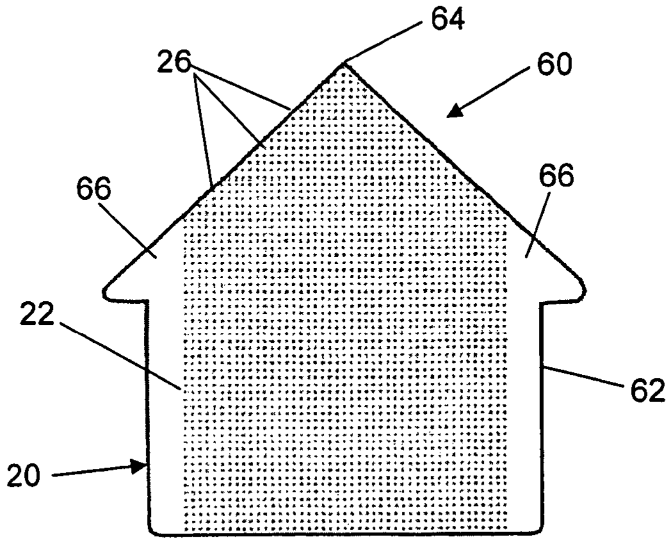
FIG. 8 is a top view of a label in accordance with a fourth exemplary embodiment of the present invention.

With reference to FIG. 7, a second label 60 is shown in an exemplary embodiment. The second label 60 has an irregular peripheral edge 62. The irregular peripheral edge 62 may define a known shape such as the arrow outline indicated for the second label 60. The second label 60 is formed of the paper stock 20 and includes the adhesive areas 26 that form a repetitive dot pattern on the back surface 22 as shown with reference to FIGS. 1 and 2. The second label 60 may include a leading edge 64. The leading edge 64 may extend along any length of the peripheral edge 62. As shown with reference to FIG. 8, the second label 60 may include one or more non-adhesive area 66.

The adhesive areas 26 are formed by coating the adhesive onto either the back surface 22 or the release liner 36 using the well known gravure printing method. The gravure printing method involves coating or extruding a layer of pressure-sensitive adhesive onto an etched rotary tool having structures that form the adhesive areas 26. A web of material is processed through the etched rotary tool thereby applying the pressure-sensitive adhesive to the web of material.

Figure 9:
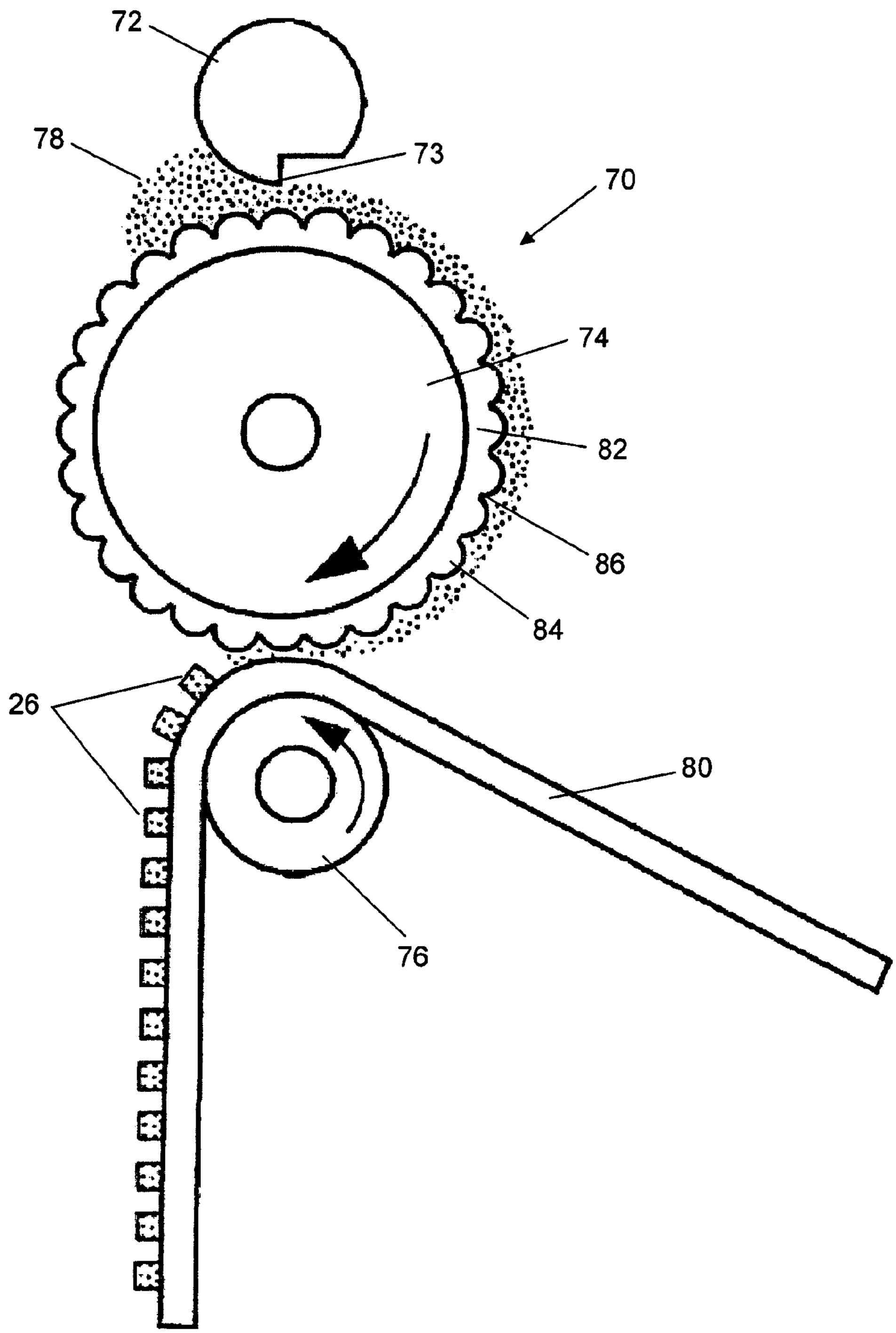
FIG. 9 is a schematic diagram of an exemplary gravure coating apparatus for practicing the present invention.

With reference to FIG. 9, a gravure coater 70 is shown in an exemplary embodiment. The gravure coater 70 includes an adhesive coating pan 72, a gravure roll 74, a backup roll 76, adhesive 78, and a web of material 80. The adhesive coating pan 72 stores the adhesive 78. The gravure roll 74 transfers the adhesive 78 onto the web of material 80. The backup roll 76 pinches the web of material 80 to the gravure roll 74 for application of the adhesive 78. A pan fed gravure coater is shown for simplicity, but other configurations may be used. For example, an enclosed doctor blade feed or a slotted die feed may be used. The adhesive 78 allows repositioning of the paper stock 20 without damaging the surface of the substrate to which the paper stock 20 is applied. In an exemplary embodiment, the adhesive 78 is a water based adhesive. Water based acrylic and rubber based adhesives with full coverage have a peel adhesion curve that increases as a function of time and temperature after 30 minutes and for a period of up to 7 days Using the adhesive areas 26, however, a relatively flat peel adhesion curve results after 30 minutes providing consistent adhesion and predictable removability of the paper stock 20 from a substrate to which the paper stock 20 is applied. The web of material 80 may be either the paper stock 20 or the release liner 36.

The web of material 80 can be a long paper material that is set in the gravure coater 70 in a wound roll. The web of material 80 is pulled from the wound roll, passed between the gravure roll 74 and the backup roll 76 to adhere the adhesive 78, and then wound onto a second roll. The gravure roll 74 and the backup roll 76 rotate in the respective directions shown in FIG. 9. In an alternative embodiment, the web of material 80 may be in the form of stacked sheets.

The shape, size, and distribution of the adhesive areas 26 is created using a mold layer 82 overlaid on the gravure roll 74. The mold layer 82 includes ridges 84 and recesses 86 that define the shape, size, and distribution of the adhesive areas 26 that are formed on the web of material 80. The adhesive 78 fills the recesses 86 of the mold layer 82 on the periphery of the gravure roll 74. Passage of the web 80 between the gravure roll 74 and the backup roll 76 transfers the filled recesses 86 of adhesive 78 to an outer surface of the web of material 80.

As known to those skilled in the art, the gravure roll 74 is rotated by a motor (not shown) in a clockwise direction. An upper portion of the gravure roll 74 receives the adhesive 78 from the adhesive coating pan 72. A leading edge 73 of the adhesive coating pan 72 contacts the periphery of the gravure roll 74 scraping off extra adhesive 78 deposited on the ridges 84 of the mold layer 82 leaving adhesive 78 in the recesses 86. The backup roll 76 is rotatably biased toward the gravure roll 74. The backup roll 76 is rotated by movement of the web 80 and the rotation of the gravure roll 74 in the direction shown.

The adhesive areas 26 can be applied to the paper stock 20 or the release liner 36. Additionally, the process of forming either the first label 50 or the second label 60 can be performed using a variety of processes. In a first exemplary embodiment, the adhesive areas 26 can be applied to the paper stock 20 opposite the previously applied ink layers 42 and laminated to the release liner 36 using the coating 44. In a second exemplary embodiment, the adhesive areas 26 can be applied to release liner 36 and laminated to the paper stock 20 opposite the previously applied ink layers 42 using the coating 44.

The paper stock 20 can be die cut to form the shapes desired, for example, as shown with reference to FIGS. 5-8. High speed applicators for newspapers require that the leading or forward edge of a label have adhesive to allow transferring from the peeler plate to the paper on the conveyor. Using the adhesive areas 26, virtually any shape performs well using high speed applicators because the leading edge can always have an adhesive coating.

A label face fully covered with adhesive provides adequate adhesion to a surface such as a newspaper, but also potentially leaves adhesive residue on the applicator, removes ink from the surface of the newspaper, and/or causes a tear in the newspaper when removal of the label is attempted. Lowering the coat weight of the adhesive may minimize these issues, but at the same time negates the ability of the adhesive to be repositionable and to adhere to difficult substrates such as textured surfaces like wood desks, auto dashboards, or other places that notes or labels are reapplied by the consumer. The adhesive areas 26 remove cleanly from surfaces such as newspapers, can be repositioned, and can be reapplied to difficult substrates.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The exemplary embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents. Thus, the description of the preferred embodiments is for purposes of illustration and not limitation.

What is claimed is:

1. A sheet comprising:

a paper stock having an adhesive receiving face, a print receiving face opposite the adhesive receiving face and an adhesive coating coated on the adhesive receiving face in a uniform, discontinuous, repetitive pattern of adhesive areas;

wherein;

the adhesive is a water based, pressure sensitive adhesive;

the sheet is configured to form a label, and the label is removable from a paper object, after attachment to the paper object, without damaging the paper object.

2. The sheet of claim 1, wherein the sheet further comprises ink printed on the print receiving face.

3. The sheet of claim 2, further comprising a coating laminated on the print receiving face.

4. The sheet of claim 3, wherein the coating is a printable release coating.

5. The sheet of claim 1, further comprising a release liner wherein the adhesive coating removably adheres to the release liner.

6. The sheet of claim 5, wherein the release liner is coated with a release coating.

7. The sheet of claim 6, wherein the release coating includes silicone material.

8. The sheet of claim 1, wherein the sheet is die cut to form an irregularly shaped label.

9. The sheet of claim 1, wherein the adhesive areas are separated by about 0.5 millimeters.

10. The sheet of claim 1, wherein the adhesive areas are circles having a diameter in the range from about 0.5 millimeters to about 1.25 millimeters.

11. The sheet of claim 10, wherein the adhesive areas are circles having a diameter in the range from about 0.9 millimeters to about 1.25 millimeters.

12. The sheet of claim 1, wherein the adhesive areas have a height of about 0.375 mm.

13. The sheet of claim 1, wherein the paper object is a newspaper.

14. The sheet of claim 1, wherein the adhesive areas are circles, polygons, or ellipses.

15. The sheet of claim 1, wherein the label is configured to be applied to a second object after removal from the paper object.

16. A sheet comprising:

a label comprising:

a paper stock comprising an adhesive receiving face, and a print receiving face opposite the adhesive receiving face; and a release liner comprising a release coating and having an adhesive receiving face;

wherein;

the release coating or the adhesive receiving face is coated with an adhesive in a uniform, discontinuous, repetitive pattern of adhesive areas;

the uniform, discontinuous, repetitive pattern of adhesive areas allow removal of the paper substrate from a paper object after attachment to the paper object using the adhesive without damaging the paper object, the adhesive removably adheres to the release liner, and the adhesive is a water based, pressure sensitive adhesive and the object is a newspaper.

17. The sheet of claim 16, wherein the sheet further comprises ink printed on the print receiving face of the paper substrate.

18. The sheet of claim 17, further comprising a coating laminated on the print receiving face of the paper stock.

19. The sheet of claim 16, wherein the sheet is die cut to form an irregularly shaped label.

20. The sheet of claim 16, wherein the adhesive areas are separated by about 0.5 millimeters.

21. The sheet of claim 16, wherein the adhesive areas are circles having a diameter in the range from about 0.5 millimeters to about 1.25 millimeters.

22. The sheet of claim 21, wherein the adhesive areas are circles having a diameter in the range from about 0.9 millimeters to about 1.25 millimeters.

23. The sheet of claim 16, wherein the adhesive areas have a height of about 0.375 mm.

* * * * *